United States Patent

[11] 3,589,677

| [72] | Inventor | Henri Segers<br>277, rue du Velodrome, Rettine, (Liege), Belgium |
|---|---|---|
| [21] | Appl. No. | 689,449 |
| [22] | Filed | Dec. 11, 1967 |
| [45] | Patented | June 29, 1971 |
| [32] | Priority | Dec. 12, 1966, Jan. 23, 1967 |
| [33] | | Belgium |
| [31] | | 41,176 and 41,218 |

[54] PISTON VALVE
1 Claim, 6 Drawing Figs.

[52] U.S. Cl.................................................. 251/215,
251/334, 251/357, 251/368, 137/375
[51] Int. Cl......................................................... F16k 31/50
[50] Field of Search.......................................... 251/214,
215, 314, 317, 316, 324, 357, 358, 368, 331, 333,
334; 137/375, 454.6; 277/228, 229

[56] References Cited
UNITED STATES PATENTS

| 2,597,976 | 5/1952 | Cousins........................ | 277/229 X |
| 2,859,061 | 11/1958 | Reid............................. | 277/229 X |
| 3,086,550 | 4/1963 | Cummings.................... | 251/358 X |
| 3,093,359 | 6/1963 | De Woody.................... | 251/368 X |
| 3,194,533 | 7/1965 | McLay......................... | 251/368 X |
| 3,213,524 | 10/1965 | Prather et al. ................ | 251/357 X |
| 3,255,775 | 6/1966 | Albro et al.................... | 251/215 x |
| 3,337,182 | 8/1967 | Roy, Sr......................... | 251/368 X |
| 2,710,629 | 6/1955 | Price ............................ | 251/331 |

FOREIGN PATENTS

| 905,717 | 9/1962 | Great Britain................ | 251/314 |

*Primary Examiner*—William F. O'Dea
*Assistant Examiner*—David R. Matthews
*Attorney*—Jacob L. Kollin ABSTRACT: Piston valve, more particularly made of glass and synthetic material, comprising a cylindrical or slightly conical body flaring in the downward direction, provided with arms and in which there is mounted a piston constituted by a rigid core covered with a compressible flexible material, the latter being itself covered with a thin rigid material acting as a lubricant.

PATENTED JUN29 1971  3,589,677

INVENTOR:
HENRI SEGERS
by Jacob L. Kollin
ATTORNEY

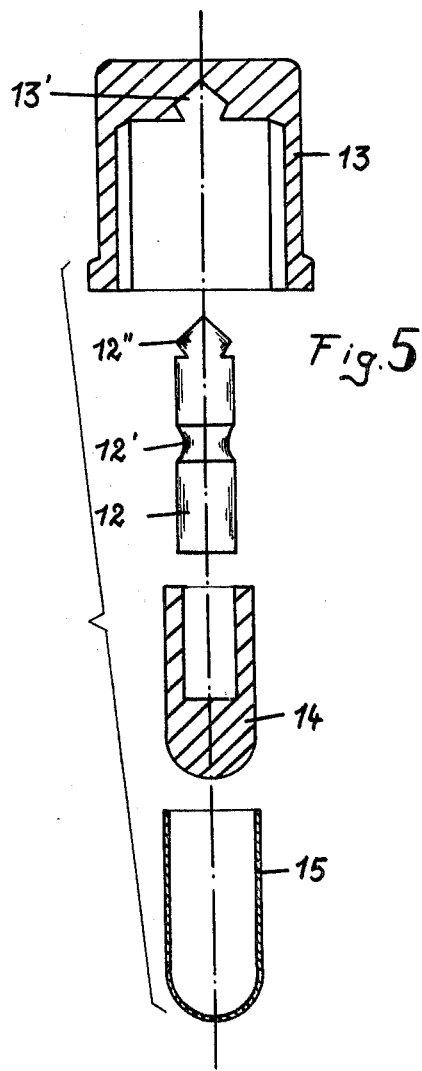
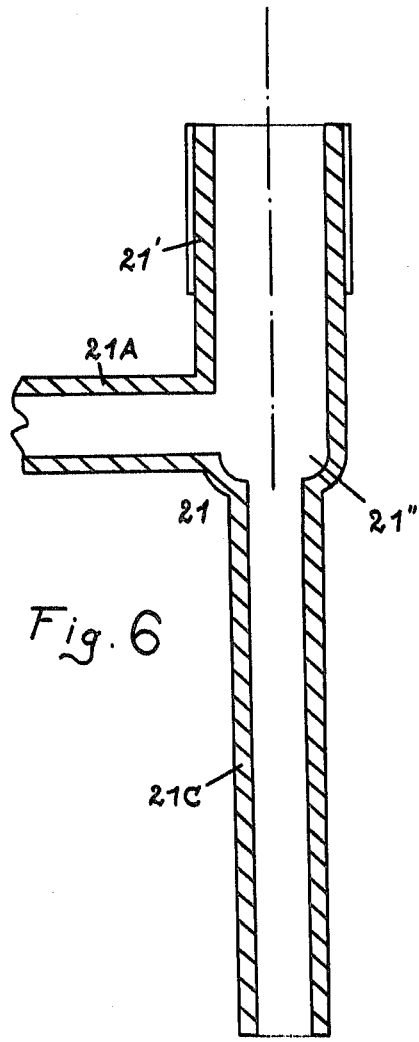

PISTON VALVE

BACKGROUND OF THE INVENTION

The present invention relates to a piston valve used for allowing or completely or partially blocking the passage of a fluid or a gas, and which is particularly applicable, but not exclusively, to apparatus used in chemical laboratories.

For very many years, chemists used in the connection of their various apparatus valves composed of a glass core rotatable in a glass plug. These conventional valves require precise and intricate machining involving many manipulations.

These elements cause a large number of disadvantages both to the user and to the producer. Given the necessity of carrying out analyses without any traces of grease and since the valve becomes blocked if the glass is attacked by certain chemical products, there has appeared on the market a combination of a glass plug and a solid core made of a noncorroding synthetic material which is referred to as being self-lubricating and which is known under the name of "Teflon PTFE." However, this valve, which is of superior quality, requires a higher production cost than that of a traditional valve.

These considerations have led to the conceiving of a novel valve arrangement retaining the advantages described hereinbefore whilst eliminating the disadvantage of high cost. The construction of such a valve according to the invention is simple since it uses standard components which are interchangeable and easy to mass-produce by means of existing machines.

A piston valve according to the invention is characterized in that it comprises a cylindrical or slightly conical body made of glass or other material provided with arms and in which there is mounted a piston constituted by a rigid core covered with a compressible flexible material, the latter being itself covered with a thin rigid material acting as a lubricant.

Also according to the invention the valve is characterized in that the piston with its various covers has a larger diameter than the internal diameter of the valve body, the piston being thus under pressure within the said body.

Other features of the invention are described hereinafter on the basis of the accompanying drawings which are given simply by way of example, and wherein:

FIG. 5 is an exploded sectional view through the piston of the valve of FIG. 4; and FIG. 6 is a sectional view through a modified form of embodiment of the valve body according to the invention.

Figure 1:
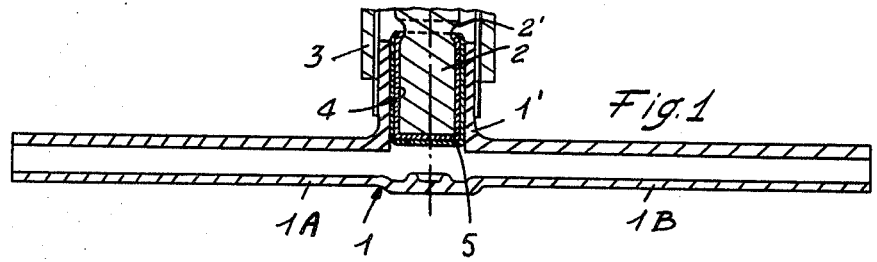
FIG. 1 is a sectional view through a valve constructed according to the invention.

The piston valve according to the invention comprises two main parts. By way of example, the valve described hereinafter on the basis of the drawings comprises an external part 1 made of glass constituting the valve body and an internal part formed of a plurality of elements made of synthetic material constituting a piston. The internal part consists of a piston proper or stem 2 made of hard natural or synthetic material, which is surmounted by a screw-threaded cap 3 intended to be screwed on to the upper externally screw-threaded portion 1' of the glass body 1, a cylindrical cover cap made of flexible and elastic synthetic material intended to enclose the said stem 2, and a second cylindrical cover cap 5 made of synthetic material acting as a protecting and lubricating means of the "Teflon PTFE" (polytetrafluorethylene) type, of slight thickness and intended to be inserted over the two other elements 2 and 4, compressing them slightly.

The stem 2 forming the piston proper comprises towards its upper portion a peripheral groove 2' constituting a reduction in diameter. This groove is arranged at a suitable height so that the ends of the two cover caps 4 and 5 fold over into it, but this folding is not indispensable.

According to the invention, therefore, there is obtained a piston comprising a rigid core 2 supporting successively a cover cap made of flexible material 4 and a cover cap made of rigid material 5 of the "Teflon" type, which by its thinness retains sufficient elasticity to ensure that, combined with its support 4, it can adapt itself to the very slight irregularities on the internal surface of the upper portion 1' of the glass body 1 and thus ensure sealing tightness, the assembly being held compressed is the said body by the screw-threaded cap 3.

Figure 2:
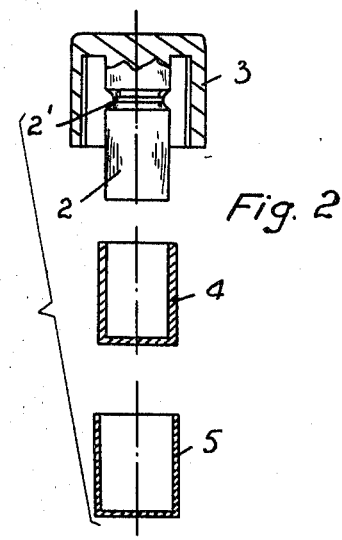
FIG. 2 is a sectional view through the valve piston of FIG. 1, all the parts being disconnected from one another.
Figure 3:
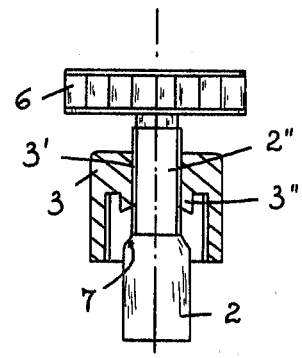
FIG. 3 is a sectional view through a modified form of embodiment of a piston for a valve according to the invention.

In the embodiment shown in FIGS. 1 and 2 the internal part of the valve, stem 1 and cap 3, is made in one piece. In FIG. 3 there is shown a variant intended to be used for a high-pressure valve. In this embodiment there is again a screw-threaded cap 3, provided at its upper face with a central screw-threaded hole 3' into which can slide the screw-threaded end portion 2" of the stem or piston proper 2, said portion 2' being of smaller diameter than the stem itself and being surmounted by an operating knob 6. The cap 3 is provided at the internal wall of its upper face with a projecting portion 3" forming a sealing seat with the shoulder 7 provided at the connection between the stem 2 and its screw-threaded portion 2" in the open position of the valve.

Figure 4:
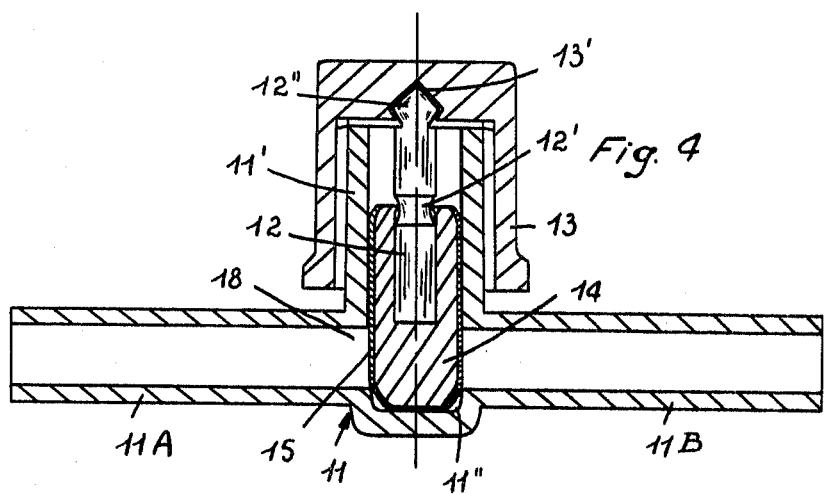
FIG. 4 is a sectional view through a modified form of embodiment of a valve constructed according to the invention.

Another form of embodiment of a piston valve according to the invention is shown in FIGS. 4 and 5. Here also the valve is composed of two main parts, the external part 11 made of glass and the internal part or piston 12 made of rigid synthetic material with its screw-threaded cap 13 and its cover caps 14 and 15 respectively made of flexible compressible synthetic material and rigid, thin synthetic material.

The cylindrical or slightly conical body 11' of the glass part 11 comprises a seat or well 11" which is flat but has rounded corners or is concave in form in order to ensure perfect sealing tightness when the valve is closed. The orifices 18 of the body 11' are given the same diameter as the internal diameter of the arms 11A, 11B, to avoid any throttling effect, which would facilitate the formation of air bubbles in the liquids situated in the arms. Such throttling effects are also a source of disturbances in high-vacuum technique.

In the drawings, the body has been shown as cylindrical. If this body is conical the internal diameter at the upper open side of the valve is to be smaller than the internal diameter at the seat side, to ensure the sealing tightness of the valve in the open position.

The piston 12 with its screw-threaded cap 13 are made as two separate pieces, the stem 12 comprising at its upper end an end portion 12" of appropriate or to be gripped in a housing 13' with a certain amount of play, in order that the cap and the piston can rotate freely on their own axes and thus prevent spinning movement when the piston moves upwards and downwards.

Over a certain portion of its height, the piston 12 comprises a peripheral groove 12' formed with the same object as the groove 2' in the piston 2 in FIGS. 1 and 2.

The cover cap 14 made of very flexible and compressible synthetic material or pure rubber has a slightly smaller internal diameter than the external diameter of the piston 12 and a wall thickness such that the entire assembly is under pressure in the cylindrical body 11' of the glass part 11, to ensure sealing tightness in the open position of the cock. The thickness of the bottom of the said cover is at least equal to or greater than the diameter of the arms 11A, 11B. Its lower external surface is flat in form with a rounded edge or, as illustrated, of spherically rounded shape.

The covercap 15 made of rigid or semirigid synthetic material, for example polytetrafluorethylene, is of slight thickness to permit of obtaining maximum elasticity. The external surface is perfectly smooth. The bottom of the said cover, both internally and externally, is flat in form with rounded edges or, as illustrated, of spherically rounded shape. The said cover 15 is of uniform thickness. Its internal diameter is equal to the external diameter of the cover 14.

In the two examples of embodiment of FIGS. 1, 2 and 3, 4, there has been illustrated a valve body whose arms are in prolongation with one another. A valve according to the invention may equally well be provided with a body whose arms are not in alignment with one another and are arranged, for example, at right angles, as in FIG. 5. Here, the external part 21 is constituted of a cylindrical body 21' which is externally screw-threaded and provided with a seat 21'' at its base, an arm 21A arranged at right angles relatively to the axis of the body 21', and an arm 21C arranged in alignment with the said axis.

The preceding description based on the drawings has talked of valves made of glass and synthetic material, but of course it would not constitute a departure from the scope of the invention to apply the features of the present invention to valves where the parts made here of glass would be constituted by metal parts, synthetic material or some other material.

I claim:
1. Piston valve of glass and synthetic material, comprising a substantially cylindrical hollow glass body provided with arms communicating with said body and arranged oppositely one another, a piston displaceable in said body, said piston constituted of a rigid core covered with a compressible flexible material and a thin rigid cover of replaceable inert material enclosing said compressible flexible material, said thin rigid cover acting as a lubricant, said piston with said rigid cover having a larger diameter than the internal diameter of the valve body, the bottom of said glass body constituting a seat for the piston and being formed as a flat surface with rounded edges, said glass body having oppositely arranged orifices for communicating with said arms, said orifices being of substantially the same diameter as that of said arms.